United States Patent [19]
Monslow et al.

[11] Patent Number: 4,890,320
[45] Date of Patent: Dec. 26, 1989

[54] TELEVISION BROADCAST SYSTEM FOR SELECTIVE TRANSMISSION OF VIEWER-CHOSEN PROGRAMS AT VIEWER-REQUESTED TIMES

[76] Inventors: H. Vincent Monslow, 11815 Rosehill Rd., Overland Park, Kans. 66210; Steven R. Dickey, 2009 W. 103rd St., Leawood, Kans. 66206

[21] Appl. No.: 204,585
[22] Filed: Jun. 9, 1988
[51] Int. Cl.[4] ............................................. H04N 7/167
[52] U.S. Cl. ........................................... 380/10; 380/5; 358/85; 358/86; 455/3; 455/5
[58] Field of Search .................... 358/85, 86; 380/5, 7, 380/10; 455/2-6

[56] References Cited

U.S. PATENT DOCUMENTS

| | | | |
|---|---|---|---|
| 3,278,677 | 10/1966 | Fannoy | 358/86 |
| 3,654,708 | 4/1972 | Brudner | 358/85 X |
| 4,008,369 | 2/1977 | Theurer et al. | 455/4 X |
| 4,074,310 | 2/1978 | Hurney et al. | 455/2 X |
| 4,323,921 | 4/1982 | Guillou | 455/2 X |
| 4,381,522 | 4/1983 | Lambert | 455/4 X |
| 4,506,387 | 3/1985 | Walter | 358/86 X |
| 4,518,989 | 5/1985 | Yabiki et al. | 358/86 |
| 4,567,512 | 1/1986 | Abraham | 358/86 |
| 4,584,603 | 4/1986 | Harrison | 358/86 |
| 4,590,516 | 5/1986 | Abraham | 358/86 |
| 4,761,684 | 8/1988 | Clark et al. | 358/86 |
| 4,763,191 | 8/1988 | Gordon et al. | 358/86 |
| 4,789,863 | 12/1988 | Bush | 380/10 X |

FOREIGN PATENT DOCUMENTS

| | | | |
|---|---|---|---|
| 0082077 | 6/1983 | European Pat. Off. | 358/85 |
| 0143881 | 11/1980 | Japan | 358/85 |
| 0003830 | 8/1985 | World Int. Prop. O. | 358/85 |

OTHER PUBLICATIONS

Nakajima, "Enhanced Video Response System: VRS Phase II"; Japan Telecommunications Review, (vol. 21, No. 3; 7/79; pp. 209-217).

Primary Examiner—Stephen C. Buczinski
Assistant Examiner—Bernarr Earl Gregory
Attorney, Agent, or Firm—Steven R. Dickey

[57] ABSTRACT

A televsion broadcast system using land lines is provided for real-time transmission of a viewer-chosen program at a viewer requested time to the requesting viewer's television receiver. The preferred method includes the steps of providing a collection of stored programs, communicating the requesting veiwer's choice of the program chosen from the collection and a requested time for viewing the chosen program, selecting the chosen program from a collection, transmitting the chosen program at the requested time for viewing on the requesting viewer's receiver, and preventing intelligible viewing of the chosen program on other receivers.

13 Claims, 2 Drawing Sheets

TELEVISION BROADCAST SYSTEM FOR SELECTIVE TRANSMISSION OF VIEWER-CHOSEN PROGRAMS AT VIEWER-REQUESTED TIMES

BACKGROUND OF THE INVENTION

1. Field of the Invention

The present invention relates to a community antenna television (CATV) system. More particularly, the present invention relates to a system in which a viewer can choose a program and request a time for viewing of the chosen program on the viewer's television receiver.

2. Description of the Prior Art

With over half the homes in the U.S. now equipped with video cassette recorders, a major industry has developed which includes thousands of video stores for renting movies and other programs on video cassettes in order to satisfy a demand for over three billion rentals a year. One of the reasons video tape cassette rentals have become so popular is that the viewer can rent a desired program cassette from the video store's assortment and then view that program whenever desired. This is in contrast to conventional broadcast television or premium cable television in which the viewer neither chooses the program being transmitted nor the time at which it is transmitted.

Even with the advantages of cassette rental, certain problems are apparent. For example, the viewer must make a first round-trip to the video store to pick up the desired program cassette and then make a second round-trip to return the cassette. Additionally, the viewer may make a trip to the video store only to find that the movie is unavailable either because all of the available copies have already been rented, or that particular video store does not stock the desired movie. If such occurs, not only is the viewer inconvenienced, but the video store also loses potential rental revenue.

Furthermore, the existing system for renting video cassettes presents some inherent inefficiencies. For example, in order to minimize inconvenience to the customer, the video store must be located at a premium, high rent, location such as a corner intersection or a shopping mall and pay the high rent associated with the premium location.

Second, each video store must carry a complete library of video taped programs most of which are unused at any given time. For example, it a video tape store may carry an inventory of over 5,000 program titles representing thousands more video cassettes owing to the duplication of many of the titles. The inventory problem is magnified if duplicate cassettes are stocked in VHS and BETA formats. At any given time, however, only a relatively small percentage of the titles will be rented which are typically the currently most popular programs. Even with such a large inventory, the video store can satisfy relatively few requests for the most popular programs. That is to say, even if a number of copies of a currently popular program are in stock, the demand for this program may far exceed this number of copies and potential revenue is lost while other titles lie idle.

Third, the inventory problem for video rental stores is a growing one in that new titles are released to the video market each month with the result that the number of titles in a video store's inventory grows by at least this amount each month. The physical space required to store these additional titles may grow at an even faster rate because more than one copy of each title may be purchased. In order to handle the ever increasing number of cassettes, the video store must increase its storage capacity for which it must pay a higher rent because of the store's premium location.

In order to solve some of the problems associated with the video cassette rental industry, various prior art solutions have been proposed. For example, Pat. No. 4,506,387 which is hereby incorporated by reference discloses a system in which a cable television system (CATV) may download a recording from a central location over its cable trunk line to a memory module included in the viewer's television receiver. The program is downloaded in non-real time, typically in about 30 seconds, and the viewer then activates the memory module to view the program stored therein. The '387 patent presents some disadvantages, however, in that the central location must be equipped to download the program in non-real time. Additionally, each viewer's receiver must be equipped with a memory module to store the downloaded program. Such equipment may be prohibitively expensive and may be also inefficient in that a viewer's receiver must be properly equipped even though a particular viewer may seldom, if ever, desire to take advantage of the capability.

Patent No. 4,381,522 which is hereby incorporated by reference discloses a system in which a viewer can telephone the cable company's central location and electronically select a specialized recording such as a commercial advertisement for broadcast over one of the unused channels of the cable television system. A computer then schedules the program, transmits it at the scheduled time, and separately transmits a directory of all of the scheduled programs on another unused channel. The viewer then observes the directory channel to see when the requested recording is scheduled, and then turns to the channel indicated at the scheduled time to view the program. The provision of the directory channel encourages other viewers to view one of the scheduled recordings also. The system as disclosed in the '522 patent does not allow the viewer to determine when the program is to be scheduled and furthermore provides no means by which receivers other than the one of the requesting viewer are prevented from viewing the scheduled program.

SUMMARY OF THE INVENTION

The present invention solves the problems as outlined above. The invention hereof allows a viewer to choose a program from a collection and to view that program at a viewer-requested time on the viewer's receiver for which the viewer is billed and which also prevents non-requesting viewers from intelligible viewing of the chosen program on their associated receivers. This allows a viewer to "rent" a program without the need for a VCR.

The present invention is advantageously and preferably implemented in the context of a television transmission system, typically a CATV system, which uses land lines such as coaxial cables or fiber optic cables for transmitting programs to a plurality of subscriber's receivers. Preferably the television transmission system is an "addressable" system in which selected programs are scrambled to prevent intelligible viewing thereof and in which a descrambling signal can then be addressed to the receiver associated with the requesting viewer which in turn prompts the included control unit to descramble the program transmission for viewing on that receiver.

The preferred method of the present invention involves the steps of providing a collection of stored programs, selecting a program chosen from the collection for transmission at a requested time in response to a request from a viewer, transmitting the chosen program in real-time over the system's land lines at the requested time, and preventing intelligible viewing of the chosen program at the requested time by receivers other than the requesting viewer's receiver. More particularly, the preferred method includes the steps of scrambling the transmission of the chosen program and transmitting decoder signals to the requesting viewer's receiver in order to allow intelligible viewing of the chosen program thereon only by the requesting viewer and thereby preventing intelligible viewing by others.

Additionally, the preferred method also includes the steps of transmitting the chosen program at the requested time over a selected channel and communicating the identity of the selected channel only to the requesting viewer.

In preferred forms, the method hereof includes the steps of transmitting address signals specific to the control unit associated with the requesting viewer and transmitting associated descrambler signals specific to the selected channel over which the chosen program is being transmitted.

Advantageously, the preferred method includes the steps of identifying a section of the land lines having a subset of receivers operably coupled thereto, transmitting the chosen program over the section of the land lines, identifying a juncture between the section and the remaining portion of the land lines, and preventing transmission of the chosen program therebeyond by use of a blocking device located at the juncture.

The preferred apparatus includes a collection of stored programs, means for selectively choosing certain ones of the programs for transmission, means for transmitting a chosen program at a requested time, and a scheduling computer for scheduling program choices and requested times. The preferred apparatus also includes computer means for receiving information from the requesting viewer as encoded signals preferably over telephone lines using telephone touch-tones. In especially preferred forms, the computer means is equipped for voice communication with the requesting viewer either in the form of synthetically generated voice signals or prerecorded selected messages.

Other preferred aspects of the present invention are explained hereinbelow.

BRIEF DESCRIPTION OF THE DRAWING FIGURES

DETAILED DESCRIPTION OF THE PREFERRED EMBODIMENTS

The present invention is preferably implemented in the context of a conventional community antenna television (CATV) system, the equipment and operation of which are well understood by those skilled in the art and which are explained in part in the Electronics Engineer's Handbook, Second Edition, which is hereby incorporated by reference.

Figure 1:
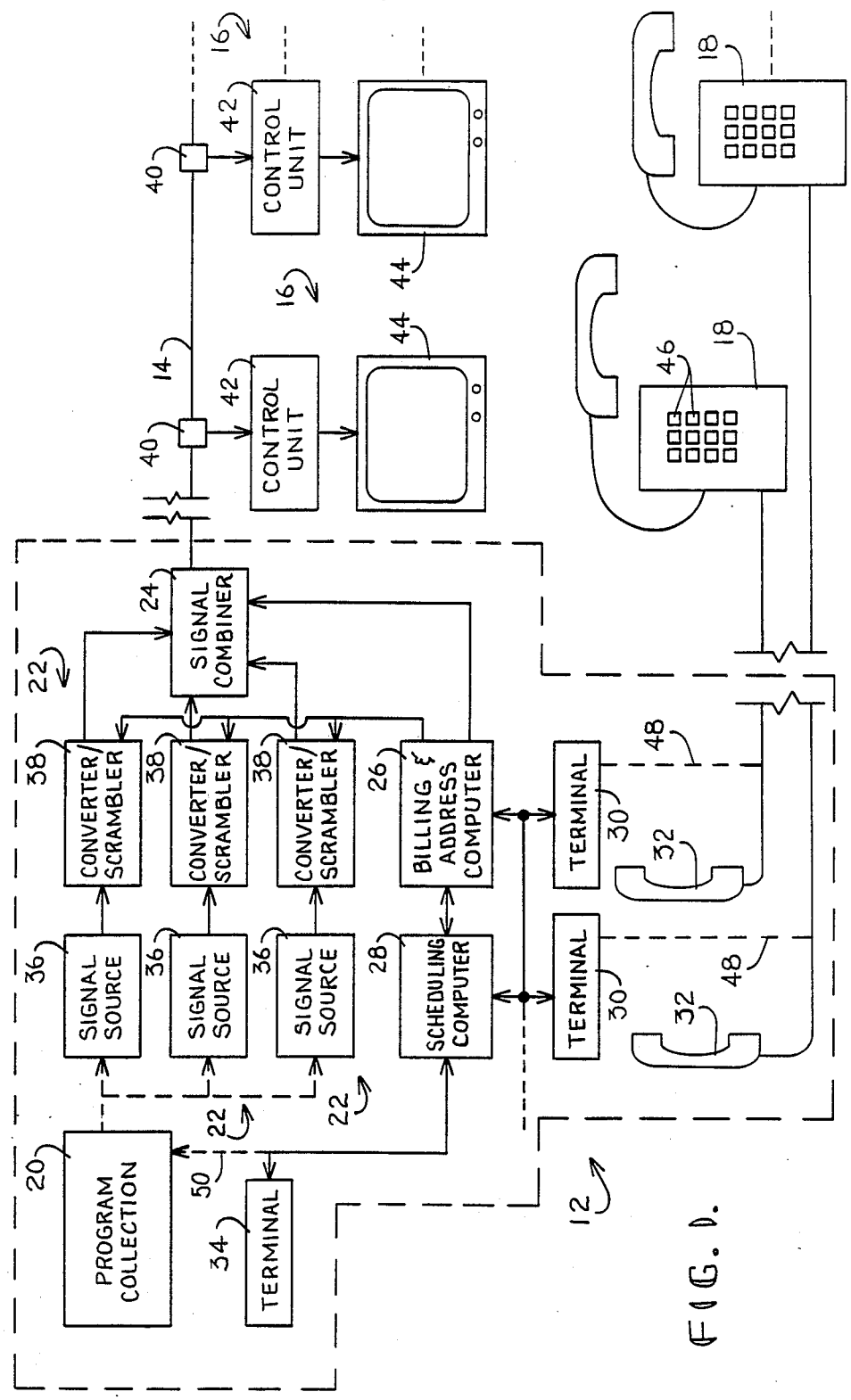
FIG. 1 is schematic illustration of the preferred configuration of the present invention.

Preferred system 10 (FIGS. 1) includes central unit 12, land lines 14, a plurality of viewer-associated receivers 16, and a plurality of viewer-associated telephone handsets 18.

Central unit 12 includes program collection 20, a plurality of signal transmitters 22, signal combiner 24, billing and address computer 26, scheduling computer 28, a plurality of input data computer terminals 30 having associated telephone units 32, and output schedule computer terminal 34.

Program collection 20 includes a plurality of programs stored on a medium allowing selective reproduction and real-time transmission thereof over land lines 14 for reception by and viewing on receiver 16 by an associated viewer. Preferably, the programs stored in collection 20 are stored on ¾" video tape which allows for higher fidelity reproduction than conventional ½" video tape. Each program is preferably assigned and labeled with a catalog number, a list of which is stored in scheduling computer 28. Preferably, up to three copies of selected programs are included in collection 20 which to allow continuous transmission of ninety-minute programs at half-hour intervals if desired for currently popular programs.

As those skilled in the art will appreciate, the programs in collection 20 can be stored on a variety of media including compact disks, floppy disks, hard disks, conventional magnetic tape, electronic memory such as that disclosed in U.S. Pat. No. 4,506,387, or the like. While storage on video tape is preferred, available technology and economic factors may dictate an alternative storage medium.

Signal transmitters 22 are conventional units commonly found in the "head end" of a typical CATV system. Signal transmitter 22 includes signal source 36 and converter/scrambler unit 38.

Signal source 36 in a typical CATV system is the origination point for signals received by way of antenna, microwave, land lines from a local television station, or a video cassette recorder (VCR). Preferred signal source 36 includes a ¾" video cassette recorder (VCR) operable to receive and play video cassettes selected from collection 20 and to produce signals representative thereof for presentation to converter/scrambler unit 38.

Conventional converter/scrambler unit 38 receives signals from signal source 36 and converts those signals for output on a predetermined frequency channel. In a conventional system, these channels include low band, mid-band, high band, super band, and hyper band, which, depending upon the design of the system, may allow selection of up to seventy different channels for program transmission on a single coaxial cable trunk line. In the preferred system, unit 38 is operable to selectively scramble program transmissions.

Conventional signal combiner 24 receives the output signals from transmitters 22 on the various channels and combines those signals for transmission over land lines 14. Signal combiner 24 is also typically coupled with conventional billing and address computer 26.

Computer 26 is operable to transmit decoder signals by way of signal combiner 24 onto land lines 14 and thereby to receivers 16 which allows intelligible viewing of scrambled program transmission on selected ones of receivers 16 and prevents intelligible viewing on others. That is to say, computer 16 keeps track of which viewers which have subscribed to certain premium channels such as HBO, and periodically transmits decoder signals which include address signals specific to receivers 16. Descrambling signals are typically associated with the address signals which prompts the addressed receiver 16 to descramble the transmissions identified by the associated descrambler signals. Receivers 16 which do not receive descrambling signals associated with their respective address signals prevent intelligible viewing of the scrambled program transmission.

Computer 26 is also operable for producing billing information as appropriate for the services to which the individual viewers have subscribed. As those skilled in the art will appreciate, the various functions performed by computer 26 may be performed by separate computers.

Scheduling computer 28 is preferably a minicomputer and is operably coupled with terminals 30, with computer 26, and with terminal 34. As will be explained further hereinbelow, computer 28 receives data representative of the program choices and requested times for viewing thereof and presents outputs at terminal 34 whereby the chosen program can be selected from collection 20 for transmission by the respective signal transmitter 22 at the requested time.

In one embodiment, viewers communicate their program choices and requested viewing times by way of conventional telephone handsets 18 connected through the local telephone network. Respective customer service representatives answer the incoming calls over phone units 32 and then enter the information communicated from the viewers into scheduling computer 28 by way of respective terminals 30, each of which includes a conventional data entry keyboard and monitor.

Land lines 14 typically include coaxial cables which transmit the programs from program unit 12 to receivers 16. Receivers 16 are conventially coupled with land lines 14 by way of respective cable taps 40.

Receivers 16 each include control unit 42 and television 44. Control unit 42 converts a program transmission received from land lines 14 on one of the various transmission channels to an output on a preselected channel for reception by television 24.

Control unit 42 is also operable to selectively descramble certain of the transmissions received by way of land lines 14 from central unit 12. Each control unit 42 is equipped to receive decoder signals to detect its specific address signal from computer 26 and in response to descramble the transmission identified by the descrambling signals associated with the address signals.

In the preferred method of operating system 10, each subscribing household is provided with a catalog of the programs included in collection 20 along with the associated program identification number by which scheduling computer 28 identifies the program and by which they are labeled and stored in collection 20. Preferably, monthly supplements to the program catalog are provided as new programs are added to collection 20 and new catalogs are periodically issued incorporating the previous supplements as needed. The program listings in the catalog are preferably arranged alphabetically and also by subject category to facilitate selection of a desired type of program. Collection 20 includes full-length movies, recordings of previously transmitted regularly scheduled commercial broadcasts and other programs of interest to the subscribers. Each subscribing household is preferably provided with a confidential identication number in order to prevent unauthorized ordering and thereby billing of a program.

After a viewer has chosen a program, the viewer then uses telephone handset 18 to place a telephone call over the conventional telephone network to the telephone number associated with central unit 12. Customer service representatives answer the incoming telephone calls to whom the viewer communicates the program choice and requested time along with the viewer's name and confidential identification number. The customer service representative then enters this information by way of terminal 30 into computer 28.

In accordance with conventional computer programming techniques well known to those skilled in the art, computer 28 first determines whether the viewer's name and identification number match. If not, this fact is communicated to the representative who informs the viewer that the request cannot be satisfied without a correct match. If the customer name and identification number do match, computer 28 then determines whether the chosen program has been already previously scheduled at the requested time. If such is the case, computer 28 need not reschedule the chosen program, but rather needs only prompt address computer 26 to transmit proper decoding signals to the viewer's control unit 16 at the requested time to allow the viewer's receiver to descramble the program and to enter the billing information.

If the chosen movie has not been previously scheduled at the requested time, computer 28 determines whether a channel is available at the requested time. If yes, computer 28 selects an available channel and schedules this channel for transmission of the chosen program at the requested time. Computer 28 then presents confirmation of this to the customer service representative on the monitor associated with terminal 30 along with the channel number which is then communicated to the viewer.

Computer 28 provides scheduling information as output by way of terminal 34. In the preferred form, an operator reads the output from terminal 34 either presented on an associated monitor or as a hard copy print out. In response, the operator selects the chosen program from collection 20 and inserts into the appropriate VCR included in signal source 36 which is associated with the scheduled channel. That is to say, each transmitter 22 is associated with a specific output channel and the information provided from computer 28 by way of terminal 34 instructs the operator which VCR is to be used for transmitting the chosen program at the requested time. In the alternative, system 10 could be arranged such that any unused signal transmitter 22 can be selected and then adjusted to transmit on the scheduled channel. At the requested time the operator activates the appropriate VCR in order to transmit the program which is scrambled and converted by unit 38 and presented on the selected channel to signal combiner 24 and onto land lines 14.

Computer 28, upon scheduling the chosen program at the requested time, also interacts with computer 26 so that computer 26 sends appropriate decoder signals at the requested time and during transmission of the program to receiver 16 associated with the requesting viewer. The decoder signals include address signals specific to control unit 16 associated with the requesting viewer and prompts control unit 42 to descramble the chosen program in accordance with the descrambler signals associated with the address signal. In this way, the requesting viewer can view the program on the viewer-associated television 44. By scrambling the transmission, and by not providing a descrambling signal to other receivers, subscribers other than the requesting viewer are prevented from intelligible viewing of the chosen program.

Upon transmission of the chosen program at the requested time, billing and address computer 26 is programmed to automatically add the specified program charge to the requesting viewer's monthly bill.

If there are no available channels at the requested time, computer 28 is preferably programmed to determine the nearest available time frame during which a channel is available or to determine the nearest available time when the chosen program is already scheduled for transmission. This information is then presented to the customer service representative on terminal 30 who in turn communicates this information to the requesting viewer who may thereupon select one of the alternative times. For example, if the requesting viewer wishes to see a very popular program at a certain time, and all of the channels are already scheduled for that time, none of which include that chosen program, an unused channel may be available shortly before or after the requested time or the chosen program may be already be rescheduled at a nearby time whereupon the requesting viewer can select one of these.

As discussed above, scheduling computer 28 is programmed to ensure that the viewer's identification number matches the name of the requesting viewer, or the requesting viewer's address, and so forth. As a further check, computer 28 can be programmed to also include the requesting viewer's telephone number, and upon being provided with this information, can double check this against the confidential identification number and the requesting viewer's name and address. This provides additional assurance that unauthorized persons do not schedule programs which would be billed against another subscriber's account.

As those skilled in the art will appreciate, the requirement for a customer service representative to answer telephone 32 can be eliminated by the provision of a so-called "auto-dial" device which would allow the requesting viewer to communicate directly with scheduling computer 28 by providing appropriate encoded signals such as those provided by buttons 46 as touch-tone signals from telephone handset 18. Such systems are well known to those skilled in the art and are commonly used in banking services whereby customers can conduct transactions with their financial accounts. Such systems often include voice response systems which can be incorporated in computer 28 to provide verbal messages by way of synthesized voice or prerecorded verbal messages. The requesting viewer can respond to inquiries by the computer by entering the appropriate codes on push buttons 46. Such an interconnection with computer 28 by way of terminal 30 is indicated by the dashed lines 48.

Those skilled in the art will also appreciate that the information from the requesting viewer can be communicated to central unit 12 by using land lines 14 such as with an interactive cable system. Such systems are well known such as those described in U.S. Pat. Nos. 4,290,142, 4,408,345, and 4,710,955 which are hereby incorporated by reference.

As discussed above in connection with U.S. Pat. No. 4,506,387, program collection 20 can include programs stored in electronic memory. If such is preferred, computer 28 can be connected directly with collection 20 as represented by line 50. In addition, collection 20 can be directly coupled with signal sources 36 as illustrated by lines 52. With such an arrangement, the requirement for an operator to physically select the programs from collection 20 and in to insert them in the appropriate VCR is eliminated. That is to say, upon instructions from scheduling computer 28, collection 20 is operable to cause the chosen program to be transmitted directly to the appropriate signal source 36 for the scheduled channel at the requested time.

While the present invention is discussed in the environment of a conventional CATV system using coaxial cables such as land lines 14, the present invention is also useful it the context wherein land lines 14 are fiber optic cables or telephone lines. Fiber optic cables have the capability of carrying many more channels than a coaxial cable with repeaters spaced further apart and with somewhat greater immunity to external noise. In such a system, conventional telephone communication may also be provided over such a fiber optic cable or, in the alternative, a separate key pad, keyboard, or the like can be included as part of receiver 16 whereby the requesting viewer can enter data representative of the chosen program and requested time for transmission over the land lines 14 directly to computer 28.

A typical cable television system using a coaxial cable as a trunk line may have upwards of fifty channels unused for regularly scheduled transmissions. With the potential for thousands of receivers connected to the system, fifty unused channels may not be adequate to supply the demand viewer-chosen program viewing. It should be appreciated, however, that in this example, fifty available channels can still satisfy the program choice demands of many thousands of subscribers. For example, fifty channels transmitting the fifty most popular programs of the day may satisfy up to 80% of the program requests. It wold not be unexpected that many subscribers may request the most popular program. This, coupled with the fact that all of the subscribers will not likely be requesting movies at the same time, may allow fifty available channels to serve many subscribers.

Figure 2:
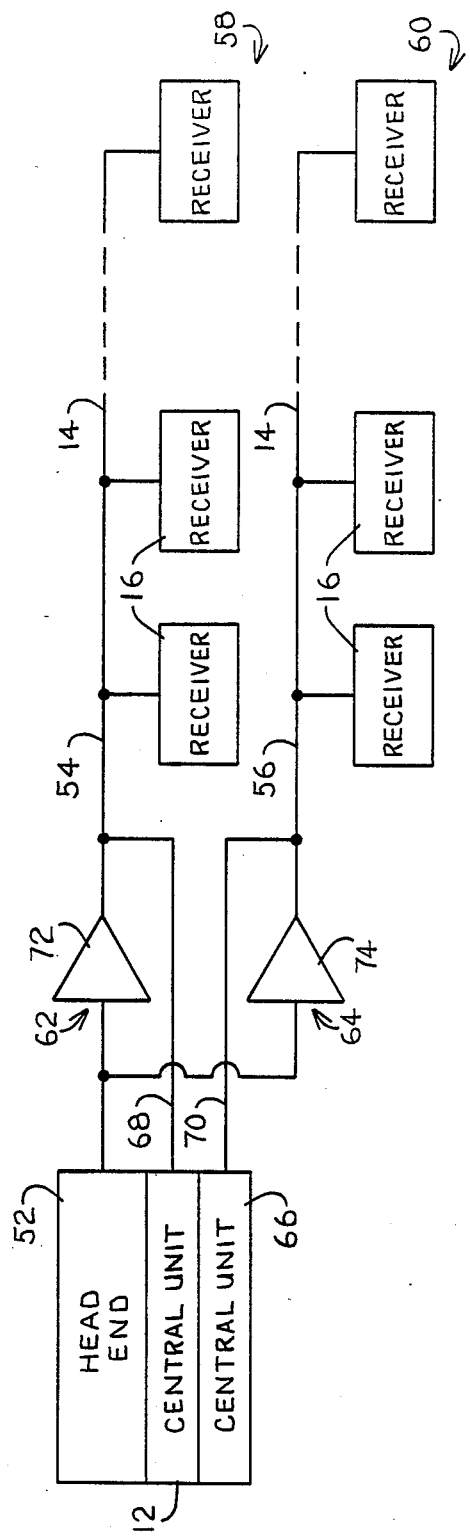
FIG. 2 is a schematic illustration showing the preferred interconnection between the configuration of FIG. 1 and sections of the transmission system.

Nevertheless, there may be some upper limit as to the number of subscribers that the available channels can adequately serve. In order to provide the optimum service to the subscribers in a system, the present invention encompasses the configuration as illustrated in FIG. 2. A typical CATV system includes a head end 52 at which the transmitted program originates and which in turn transmits the programs on the various channels by way of land lines 14. In the preferred embodiment as illustrated in FIG. 2, land lines 14 are further designated to include a plurality of sections of which sections 54 and 56 are illustrated. Each section 54, 56 includes a respective subset 58 and 60 of receivers respectively coupled thereto. Each section 54, 56 and so forth is respectively coupled to the remaining portions of land lines 14 at a respective node or juncture 62, 64.

In the preferred embodiment of the present invention, a central unit is provided for each subsection. Two such central units 12 and 66 are illustrated and are respectively coupled via lines 68 and 70 with respective sections 54 and 56. Furthermore, respective blocking devices 72 and 74 are provided at junctures 62 and 64 respectively.

Blocking devices 72 and 74 are preferably low pass filters which allow transmissions from head end 52 transmitted at the lower frequency channels to pass unimpeded therethrough. Viewer-chosen programming is preferably transmitted at the higher frequency channels directly to the respective sections 54, 56. Blocking devices 72 and 74 prevent transmission of these higher frequency channels beyond their respective sections so that they do not interfere with one another. That is to say, each program unit 12 and 66 can broadcast viewer-chosen programs on the same channel frequencies but the sections are isolated from one another by the blocking devices.

Sections of land lines 14 can be identified and designated as desired by the proper placement of a blocking device such that each program unit can adequately serve the program requests of the viewers associated with the subset of receivers included in each subsection. For example, if a CATV system has 50,000 subscribers, and it is determined that fifty channels can adequately satisfy the viewer-chosen program requests of 10,000 viewers, five sections of 10,000 receivers each would be designated with a blocking device installed at the juncture between each designated section and the remaining portions of the land lines. In this way, transmissions produced by separate central units on the same channels to separate sections would not interfere with one another. This arrangement effectively multiplies the number of available channels for viewer-chosen programs.

As preferred, central units 12, 66 and so forth, are located in physical proximity with head end 52 to take advantage of already existing equipment. It should be appreciated, however, that even with multiple central units, multiple scheduling computers, billing, and address computers may not be needed. That is to say, a single set of appropriately selected computers can serve all of the central units. Additionally, economy of a scale may dictate that all of the central units use a common program collection 20 in order to minimize the size of the inventory. Furthermore, the various program units may also share a common set of incoming telephone lines for communicating with requesting viewers.

As an alternative, however, and depending upon the configuration of the CATV network and the economics involved, it may be desirable to locate a totally independent and free-standing program unit physically adjacent its associated section of the land lines or physically adjacent another location such as the central administrative office of the CATV transmission system. That is to say, those skilled in the art will appreciate that the physical location of the program unit and whether multiple program units can use common equipment is a matter of design choice dictated by technology, economics, and so forth.

Those skilled in the art will also appreciate that blocking devices 72, 74, and so forth may include distribution repeaters or amplifiers which are designed to amplify the frequency channels emanating from head end, but by their nature inherently block passage of the higher frequency channels from the various sections to the remaining portions of land lines 14. This can be implemented by coupling line 68, immediately "downstream" of the repeater nearest juncture 62. Other repeaters downstream of this blocking repeater receive and amplify all the incoming transmissions including the transmissions from the head end and those injected at juncture 62.

As should now be apparent from the description above, the present invention allows a requesting viewer to choose a program for viewing at a requested time on the television receiver associated with the requesting viewer. The convenience provided thereby eliminates the need for the viewer to drive to a video store to pickup a chosen movie on video tape and to again repeat the trip to return the movie.

Additionally, the present invention minimizes the risk that the viewer will be unable to view the chosen program at the viewer requested time. This risk is minimized for two reasons. First, the preferred embodiment hereof designates sections of the land lines which are matched from a capacity standpoint with its associated program unit in order to satisfy the demands of the viewers associated therewith. Secondly, the present invention allows as many viewers as are connected to the system to choose the same program at the same time. This is because once the chosen program is scheduled for transmission on a particular channel, additional viewers can be added simply by transmitting the appropriate descrambling signals to the requesting viewer's receiver. In this way, many viewers can choose the currently most popular program rather than just a few as determined by the number of cassette copies available as with prior art video stores.

The present invention also avoids the need for premium rental space in which to store a large inventory of programs and eliminates the many duplications of inventory carried by the many video stores in a territory.

Having thus described the preferred embodiments of the present invention, the following is claimed as new and desired to be secured by Letters Patent:

1. A method of operating a television transmission system using land lines such as coaxial cables, fiber optic cables, and the like for transmitting television programs thereover for reception by a plurality of receivers coupled in common with the land lines said land lines being organized in plural sections where each section has a subset of plural receivers coupled thereto, the system including means for selectively preventing intelligible viewing of certain programs by certain receivers even though said certain receivers are connected to the same land line as other receivers not so prevented, said method comprising the steps of:

providing a collection of stored programs stored on a medium allowing selective reproduction and real-time transmission of said stored programs over the land lines;

selecting a chosen program from said collection for transmission at a requested time in response to a request therefor from all so requesting viewers of a given section:

transmitting said chosen program in real-time over said given section of the land lines at said requested time for reception by and viewing on all receivers of requesting viewers associated with said given section; and preventing intelligible viewing of said chosen program at said requested time on all other receivers of said given section.

2. The method as set forth in claim 1, the system including scrambler means operably coupled with said land lines for selectively scrambling the transmission of certain of the program transmissions in order to prevent intelligible viewing thereof on the receivers, a plurality of control units respectively corresponding to and operably associated with the receivers and operably coupled with the land lines, each control unit being operable for receiving decoder signals and in response thereto for selectively descrambling certain ones of the program transmissions for allowing intelligible viewing thereof on the associated receiver, and decoder signal means operably coupled with the land lines and operable for selectively transmitting decoder signals for reception by the receivers in order to allow intelligible viewing of certain ones of the programs on selected ones of the receivers, said method further including the steps of scrambling the transmission of said chosen program in order to prevent intelligible viewing thereof on the receivers, and transmitting decoder signals for receipt by said receiver associated with said requesting viewer in order to allow intelligible viewing of said chosen program thereon.

3. The method as set forth in claim 2, the system including means for transmitting a plurality of programs on a respective plurality of identifiable channels, the control units being operable for tuning to a selected channel, the decoder signals including address signals respectively specific to the control units and descrambler signals respectively associated with the address signals and respectively specific to identify selected transmissions, each control unit being responsive to specific address signals and the descrambler signals associated therewith for descrambling program transmissions on the channels identified by the descrambler signals, said method further including the steps of selecting a channel for transmission, transmitting said chosen program during said requested time on said selected channel, communicating the identity of said selected channel only to said requesting viewer, transmitting address signals specific to the control unit associated with the requesting viewer's receiver and transmitting associated descrambler signals specific to identify said selected channel.

4. The method as set forth in claim 1, the system including means for simultaneously transmitting a plurality of programs on a respective plurality of identifible channels, the receivers being operable for tuning to a selected channel, said method further including the steps of transmitting said chosen program during said requested time over a selected channel, and communicating the identity of said selected channel only to said requesting viewer.

5. The method as set forth in claim 1, further including the steps of providing computer means operable for receiving from said requesting viewer encoded signals representative of said chosen program, said requested time, and the identity of said receiver associated with said requesting viewer, said selecting step including the step of selecting said chosen program from said collection in response to said encoded signals from said requesting viewer.

6. The method as set forth in claim 5, further including the step of providing said computer means with voice interaction capability and using said computer for providing voice communication to said requesting viewer.

7. The method as set forth in claim 1, said encoded signals including telephone touch-tone signals.

8. The method as set forth in claim 1, further including the steps of providing scheduling computer means operable for scheduling multiple program choices and multiple requested times.

9. The method as set forth in claim 8, further including the steps of providing computer means for providing billing information correlated with the requesting viewer's chosen program, and providing a bill to said requesting viewer corresponding to said chosen program.

10. The method as set forth in claim 1, further including the step of providing electronic memory means having said collection stored therein.

11. In a television transmission system using land lines such as coaxial cables, fiber optic cables, and the like for transmitting programs thereover for reception by a plurality of television receivers coupled in common with said land lines, the system further including communicating means for receiving information over land lines from the viewers, the land lines including at least one section having plural receivers coupled therewith, the improvement comprising:

a collection of stored programs stored on a medium allowing selective reproduction and real-time transmission thereof over the land lines for reception and viewing thereof by selected receivers;

receiving means operably associated with the communicating means for receiving information from plural requesting viewers, said information including each requesting viewer's choice of a program chosen from said collection and a requested time for viewing of said program on a receiver associated with said requesting viewer;

selecting means operably associated with said collection and operably associated with and responsive to said receiving means for selecting a given said chosen program from said collection;

transmitting means operably associated with said selecting means and coupled with said section of land lines for transmission of said given chosen program over said section at said requested time for reception by and viewing on all receivers coupled to the section and associated with a request for said chosen program at a common requested time; and means for preventing transmission of the chosen program over any remaining portion, if any, of the land lines.

12. The apparatus as set forth in claim 11, the system including means for simultaneously transmitting selected programs over a respective plurality of channels included in a specified group of channels, said transmitting means including means for transmitting said chosen program on a selected channel other than the channel included in said selected group of channels, said preventing means including structure allowing passage of programs being transmitted on the channels included in the selected group and structure for preventing passage of transmissions on said selected channels from said section to the remaining portion of the system.

13. The apparatus as set forth in claim 12, said selected channel being at a relatively higher frequency than the channels in the specified group.

* * * * *